Jan. 6, 1970　　　P. M. KINTNER　　　3,488,589
APPARATUS FOR CLASSIFYING MEASUREMENTS ACCORDING
TO THEIR MAGNITUDES
Filed Sept. 2, 1965
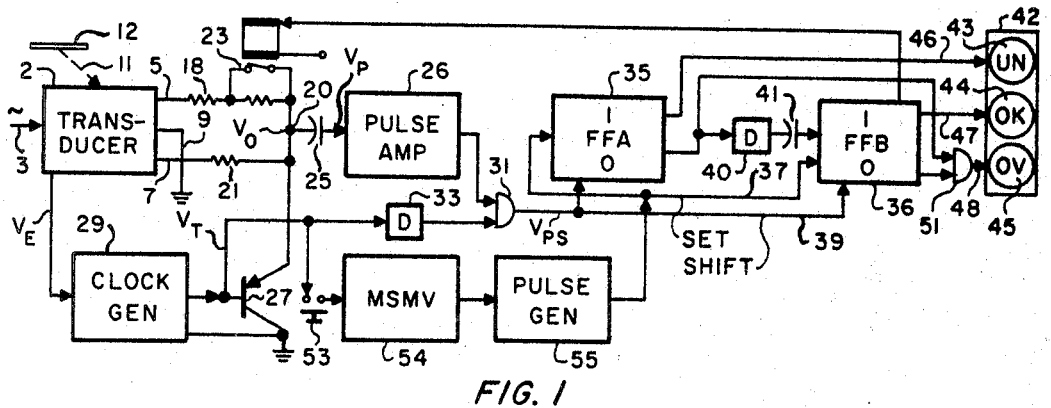
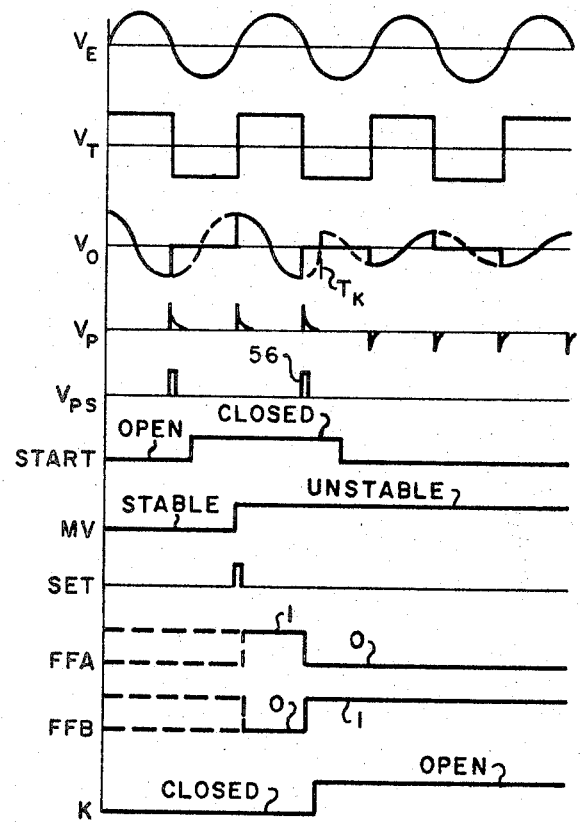
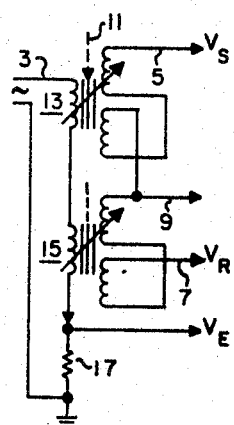
INVENTOR
PAUL M. KINTNER
BY *Henry Huff*
ATTORNEY

United States Patent Office

3,488,589
Patented Jan. 6, 1970

3,488,589
APPARATUS FOR CLASSIFYING MEASUREMENTS ACCORDING TO THEIR MAGNITUDES
Paul M. Kintner, Huntington Station, N.Y., assignor to Cutler-Hammer, Inc., Milwaukee, Wis. a corporation of Delaware
Filed Sept. 2, 1965, Ser. No. 484,620
Int. Cl. G01r 17/06
U.S. Cl. 324—99        7 Claims

ABSTRACT OF THE DISCLOSURE

A bridge circuit excited by alternating current produces an A-C output signal having an amplitude and polarity that represent respectively the magnitude and sense of the difference between a measured quantity, such as weight, and a reference or standard quantity. The peaks of the signal are sampled to produce brief pulses which control a switching device that operates stepwise to tend to balance the bridge and provides a digital output representing the magitude category of the measured quantity. The pulses can be amplified and processed by simple components that are unresponsive directly to the A-C signals, thereby avoiding stability problems and enabling rapid operation.

---

This invention relates to improvements in systems for classifying measurements according to magnitude wherein the measurements are, or can be, represented by the amplitude of an A-C signal. Such systems have a wide variety of applications including, generally, analog to digital conversion, and specifically, check weighing.

In many instances it is convenient to measure a characteristic such as displacement, pressure, temperature etc. by sensor or transducer means that expresses the value or magnitude of the measurement in terms of the amplitude of an A-C signal. A common example is the use of a linear variable differential transformer (LVDT) for gaging. The LVDT is excited with alternating current, and provides an A-C output signal of an amplitude that depends on the displacement of a movable element of the device from a null or reference position. The output voltage is either 90° or 270° out of phase with the exciting current, depending upon the sense of the displacement.

The A-C signal ordinarily cannot be utilized directly for indication or control purposes; its phase with respect to the excitation must be determined first. Also, the amplitude is usually very small, of the order of millivolts, requiring substantial amplification either before or after phase comparison. In the customary prior art practice, the signal is compared with the excitation in a phase sensitive demodulator, or phase detector, which converts the reversible phase A-C signal to a reversible polarity D-C signal of a magnitude corresponding to the ampltiude of the A-C signal. Amplification may be provided by an A-C amplifier preceding the phase detector, or a D-C amplifier following the phase detector. In either case the amplifier must be specially designed and highly stable. The amplified D-C signal is used directly to operate indicators, relays, or other utilization devices.

Systems using conventional phase detectors and stabilized amplifiers are complex, expensive, and subject to various malfunctions. They are difficult or impossible to design for extremely rapid operation, such as would be needed for making a series of measurements, each within a period of a few milliseconds. Rapid operation is desirable for on-line measurement classification systems, such as high-speed check weighers, for example.

The principal object of this invention is to provide improved measurement classification systems wherein the measurements to be classified are represented by A-C signals.

Another object is to provide improved phase comparator means, particularly adapted for systems of the above type, which are capable of rapid operation and do not require complex amplifiers or stabilization.

A further object is to provide improved digital to analog comparator means particularly adapted for measurement classification systems of the above type.

The foregoing objects are achieved according to this invention by sampling peaks of the A-C signal, producing pulses that are positive going when the A-C signal is in one of its phase relationships to the excitation and negative-going when it is in its other phase. Pulses of one polarity (positive-going, in the embodiment to be described) are selected for operating a digital switching device. The pulses are amplified by a simple amplifier that need not be critically designed. The switching device operates stepwise so as to tend to balance out the A-C signal, and provides a digital output representing the magnitude category of the measurement.

The invention will be described with reference to the accompanying drawing, wherein:

FIG. 1 is a schematic block diagram of a presently preferred embodiment of the invention in a three-zone classifying system.

FIG. 2 is a circuit diagram showing the connections of a pair of LVDT's in an arrangement suitable for use in the system of FIG. 1, and FIG. 3 is a group of graphs showing various waveforms and switching events occurring in the operation of the system of FIG. 1.

Referring to FIG. 1, a transducer 2 is adapted to be excited by alternating current supplied on an input lead 3, and to provide two alternating voltages $V_S$ and $V_R$ on leads 5 and 7 respectively. The excitation is of a conventional power supply frequency, such as 60 cycles per second. The voltages $V_S$ and $V_R$, referred to a common ground terminal 9, are in phase opposition to each other. $V_R$ is of nominally constant amplitude, and $V_S$ is variable in amplitude in accordance with the mechanical displacement of a movable element of the transducer, by input means schematically represented by the dash arrow 11. By way of example, the input means 11 may be connected to the platform 12 of a check weighing scale, to displace the transducer element by an amount depending on the weight of the platform.

One suitable transducer arrangement, shown in FIG. 2, includes an LVDT 13 with its movable magnetic core coupled to the input means 11, and a second LVDT 15 with its movable core adapted to be adjusted to a set position and fixed there. Each LVDT has two secondaries connected in series opposition, so that the net output voltage is the difference between the voltages induced in the two secondaries. When the movable core is in a center or null position, such that equal voltages are induced in the secondaries, the output voltage is minimum or zero. When the core is displaced from its null position, the voltage induced in one of the secondaries increases and that in the other decreases, and the net output voltage has an amplitude corresponding to the amount of the displacement.

The primaries of LVDT's 13 and 15 are connected in series with each other and a resistor 17. The same current from input lead 3 flows through both primaries, and the voltage drop $V_E$ across resistor 17 is exactly in phase with this current. As shown, the secondary circuits of LVDT's 13 and 15 are connected in opposite polarities to leads 5 and 7 respectively, to make $V_S$ and $V_R$ of opposite phases with respect to the common lead 9 when the transformer cores are displaced in the same sense from their null positions.

Returning to FIG. 1, lead 5 is connected through series resistors 18 and 19 to a junction point 20, and lead 7 is connected through a resistor 21 to the point 20. Normally closed contacts of a relay 23 are connected across resistor 19. The two output circuits of the transducer 2 and the resistors 18, 19 and 21 constitute a bridge which, when unbalanced, produces an output voltage $V_O$ with respect to ground at the junction point 20.

Assuming resistors 18 and 21 to be equal, and relay 23 to be closed, the bridge is balanced when $V_S = V_R$. If $V_S$ is greater or less than $V_R$, the bridge is unbalanced; $V_O$ is proportional to the difference between $V_S$ and $V_R$, and is in 90° lagging or leading phase with respect to $V_E$, depending upon which of $V_S$ and $V_R$ is the greater. For the present explanation, it is assumed that the connections within the transducer 1 and the mechanical arrangement of the input means 11 are such that $V_S$ increases with increase in the weight being measured, and $V_O$ leads $V_E$ when $V_S$ is greater than the value required to balance the bridge.

Suppose that the nominal or intended weight of an object placed on the platform 12 is one pound, and that it is desired to classify the measurement of the actual weight in one of three categories: below tolerance, if less than 15 ounces, within tolerance if between 15 and 17 ounces, and over tolerance if more than 17 ounces. To this end, the parameters of the bridge circuit are set to balance the bridge under two conditions: with 15 ounces on the platform, and relay 23 closed; and with 17 ounces on the platform, and relay 23 opened. The first (15 ounce) setting may be made by adjusting the resistance of resistor 18, or that of resistor 21, or by adjusting the position of the movable core of LVDT 15 (FIG. 2), or by a combination of such adjustments. The second setting is made by adjusting the resistance of resistor 19.

With the above settings, the bridge output voltage $V_O$ will be of finite value, and lead $V_E$ by 90°, only when the weight being checked is more than 15 ounces when relay 23 is closed, or more than 17 ounces when relay 23 is opened. Thus, if this condition of $V_O$ does not exist with the relay closed, the weight is under tolerance; if it exists with the relay closed but not with the relay open, the weight is within tolerance; and if it exists with the relay open, the weight is over tolerance.

The junction point 20 is coupled through a capacitor 25 to the input circuit of a pulse amplifier 26. The amplifier 26 is designed to provide a voltage gain of several thousand in the upper audio frequency range, and little or no gain below say 1000 cycles per second. Since the amplifier is not required to amplify low frequencies or direct current, any bypass or coupling capacitors used in it may be relatively small. The gain, phase shift and frequency characteristics are not critical and no special stabilization is required. In addition, the input impedance may be low, i.e. of the order of a hundred ohms or so, and conveniently compatible with simple transistor amplifier circuits. The capacitance of capacitor 25 is not critical, but should be chosen with regard to the input impedance of the amplifier 26 to yield an RC product of approximately the order of $1/f_c$, where $f_c$ is the low frequency cutoff of the amplifier.

The junction point 20 is also connected to the emitter of a transistor 27 connected as a "chopper" with its collector grounded, as described in the G. E. Transistor Manual, Seventh Edition, published 1964 by General Electric Company, chapter 3, pages 83–85. The transistor 27 acts as an electrically controlled switch that is closed, grounding point 20, when its base electrode is made negative with respect to ground, and is open when its base is made positive with respect to ground.

A clock signal generator 29 converts the excitation phase reference voltage $V_E$ to a flat-topped voltage wave $V_T$ that is synchronous with $V_E$ in the sense that the negative going zero crossovers of $V_T$ coincide with those of $V_E$. The generator 29 may be a square wave generator such as an amplifier and limiter, in which case the voltage $V_T$ will be a square wave in phase with the reference voltage $V_E$, as shown in FIG. 3. The voltage $V_T$ is applied to the base of the transistor 27, causing the transistor to remain open throughout the positive excursion of $V_T$, and to close substantially instantaneously as $V_T$ goes negative.

The graph of $V_O$ in FIG. 3 shows how the voltage at point 20 varies with time if the bridge circuit is initially unbalanced in the direction of excess weight on the pan 12, and then, at a time $T_K$, unbalanced to a somewhat lesser extent in the opposite direction. $V_O$ starts as a sine wave leading $V_E$ by 90°. When $V_T$ changes from positive to negative, $V_O$ is at its negative peak; the transistor 27 closes, grounding point 20, and $V_O$ abruptly rises to ground potential. The dash line portion of the graph indicates how $V_O$ would vary in the absence of switching. At the end of the negative excursion of the clock wave $V_T$, the transistor 27 opens.

While the transistor 27 is open, the capacitor 25 charges and discharges through the relatively low impedance input circuit of the pulse amplifier 26. The voltage across the capacitor at any instant will be slightly less than $V_O$, and the voltage across the amplifier input terminals will be a small fraction of $V_O$. At the negative peak of $V_O$, just before the transistor 27 closes, the right hand terminal of capacitor 25 is very slightly negative with respect to ground, and the left hand terminal is at $V_O$; i.e. the capacitor is charged to a voltage slightly less than $V_O$.

When the transistor closes, the left hand terminal of the capacitor is grounded, and the capacitor discharges abruptly into the input circuit of the amplifier 26. Since the right hand terminal of the capacitor was positive with respect to the left hand (now grounded) terminal, the discharge is a pulse that is positive going with respect to ground.

The graph of $V_P$ in FIG. 3 indicates that the input to the pulse amplifier is positive going, and of substantially the same peak amplitude as $V_O$, when the transistor closes at the negative peak of $V_O$. When $V_O$ lags $V_E$, as shown in FIG. 3 subsequent to the time $T_K$, the pulses $V_P$ are negative going.

Returning to FIG. 1, the pulse amplifier 26 is provided with means including an "and" gate 31 for rejecting the negative going pulses, and for shaping the selected pulses to a standard width and amplitude. The gate 31 has two inputs: one is the output of the pulse amplifier, which may be simply an amplified version of $V_P$, and the other is the output of a delay device 33. The device 33 is a monostable multivibrator or other known means arranged to provide a brief positive pulse shortly after each negative going crossover of the clock signal $V_T$. The gate 31 produces an output only when a pulse from the amplifier 26 and a pulse from the delay device 33 are present at the same time; the graph of $V_{PS}$ in FIG. 3 shows the output of gate 31.

Owing to the slight delay in its operation, the gate 31 eliminates undesired transients caused by closure of the transistor 27. Positive pulses of $V_P$ produced by opening of the transistor 27 are also rejected, although they are similar to those produced by closing, if the clock signal is a square wave, as illustrated. The gate 31 could be made to pass all positive $V_P$ pulses by designing the delay device 33 to operate on both negative going and positive going crossovers of the clock wave. It is preferable to use only the pulses produced by closing of the transistor 27 because slight asymmetry of the A-C waveforms can make the transistor-opening pulses sufficiently different from the transistor-closing pulses to introduce errors under some conditions. Also, it may be desired in some cases to use a clock signal in the form of a short pulse instead of a square wave, with the result that the transistor-opening pulses would not be like the transistor-closing pulses.

A pair of bistable devices 35 and 36 are connected as indicated to form a two-stage open ring counter, or stepper circuit. The devices 35 and 36 may be trigger circuits of the type commonly known as "flip flops," and are legended in the drawing as FFA and FFB, respectively.

Each is capable of being placed, or left, in either of two stable states, designated 0 and 1 respectively, by application of a pulse to a corresponding input terminal. When the device is in its 1 state, a characteristic voltage level, for example approximately ground potential, appears at its 1 output terminal, and another voltage level, for example several volts negative with respect to ground, appears at its 0 output terminal. When the device is in its 0 state the voltage levels are interchanged.

A "set" line 37 is connected to appropriate input terminals of the devices 35 and 36 for placing the device 35 (FFA) in its 1 state and the device 36 (FFB) in its 0 state when a set pulse is present on the line 37. A "shift" line 39 is coupled to the devices 35 and 36 for placing both devices in the 0 state in response to a shift pulse on the line 39. The devices 35 and 36 include means such as diodes arranged in known manner to prevent set pulses from reaching the shift line, and shift pulses from reaching the set line.

The 0 output terminal of device 35 is coupled to the 1 input terminal of device 36 through a delay device 40 and a capacitor 41. The device 40 may be a delay line or a multivibrator. The capacitor 41 may be incorporated in the bistable device 36 as part of its input circuit.

Assume the bistable devices 35 and 36 have been set to 1 and 0 respectively by a pulse on line 37. A shift pulse on line 39 will change device 35 from 1 to 0, and leave device 36 at 0. When the device 35 changes to 0, the voltage level at its 0 output terminal changes abruptly, charging the capacitor 41 after a brief interval interposed by the delay device 40, and producing a pulse at the 1 input of the bistable device 36. This delayed pulse changes the device 36 from its 0 state to its 1 state. Thus the shift pulse on line 39 transfers the 1 from device 35 to device 36. A subsequent shift pulse leaves device 35 in its 0 state and returns device 36 to its 0 state, i.e. it shifts the 1 out of the stepper.

One part of the bistable device draws appreciable current from its power supply when the device is in its 1 state, and subsequently no current when the device is in its 0 state. The actuating coil of relay 23 is connected between said part of the device 36 and the power supply. When device 36 is at 0, the relay is closed, short circuiting the bridge resistor 19. When the device 36 is in its 1 state, the relay 23 is open, placing the resistor 19 in the bridge circuit.

The output terminals of bistable devices are connected as shown to display means 42 for indicating the state of the stepper circuit. The display 42 includes indicator means 43, 44 and 45, such as lamps or annunciator devices arranged in known manner such that one of the indicators is activated only when the respective input lead 46, 47 or 48 is placed at a characteristic voltage level such as approximately ground potential. Thus the indicator 43 is activated, or "on," only when bistable device 35 (FFA) is in its 1 state; otherwise it is off. Similarly, indicator 44 is on when device 36 (FFB) is at 1. The 0 output terminals of the bistable devices are connected through an "and" circuit 51 to the lead 48. Lead 48 is at the characteristic voltage level, activating indicator 45, only when both inputs to the "and" circuit are at that level, i.e. when both FFA and FFB are in the 0 state.

Shift pulses for the stepper circuit are provided on the shift line 39 by the output $V_{PS}$ of the "and" circuit 31. These pulses, when they occur, are very slightly delayed with respect to negative going zero crossovers of the clock wave $V_T$, as explained above and shown in FIG. 3. A set pulse is required on line 37 before each classification operating cycle of the system. The set pulse is produced in response to a start signal as provided by closure of a momentary contact device 53, such as a manual pushbutton or a package sensor switch.

Operation of the device 53 can occur at any random time, but the resulting set pulse must never coincide with or overlap a shift pulse, as this would cause false operation of the stepper circuit. Accordingly, means are provided for synchronizing the set pulse with a positive going zero crossover of the clock wave $V_T$. A monostable multivibrator 54 is arranged in known manner, as by provision of conventional differentiating and rectifier means in its input circuit, to change from its stable state to its unstable state in response to a positive going zero crossover of the clock wave $V_T$. The multivibrator 54 is designed to remain in its unstable state for a period of several complete cycles of the clock wave, then revert to its stable state. A pulse generator 55 is driven by the multivibrator 54 to produce a set pulse in response to, and substantially coincidentally with, the change from stable to unstable state of multivibrator. The pulse generator 55 may be simply a differentiator and rectifier; preferably it includes conventional means for producing a set pulse of standardized amplitude and duration.

Referring to FIG. 3, the graph labelled "start" indicates the operation of the switch 53. Note that the switch remains closed somewhat longer than a complete period of the clock wave $V_T$, to insure that a positive going zero crossover will occur while the clock signal is applied to the multivibrator 54. To this end, the switch 53 may be of such mechanical design as to remain closed for the required length of time (typically about one sixtieth second) or suitable electrical time delay means may be provided to keep the circuit closed for the required interval, then open it.

Upon the occurrence of a positive going clock wave crossover, the multivibrator 54 goes to its unstable state, as indicated on the graph MV of FIG. 3. Substantially simultaneously, the pulse generator 55 is triggered to produce the set pulse shown on the graph marked "set" in FIG. 3. No further set pulses can be produced, regardless of operation of the switch 53, until the multivibrator reverts to its stable state again. This "lock up" characteristic discriminates against such effects as contact bounce in the switch 53.

Operation of the system is initiated by placing an object to be check weighed on the platform 12 and closing the switch 53, which produces a set pulse on line 37 and sets the bistable devices 35 and 36 to 1 and 0 respectively, as indicated by the graphs FFA and FFB in FIG. 3. The dash line portions of these graphs mean that FFA and FFB may be in either state prior to setting. Relay 23 is closed at this time, as shown by the graph K in FIG. 3, because FFB is at 0. The under tolerance indicator 43 is actuated, because FFA is at 1.

If the object weighs 15 ounces or less (assuming the bridge parameters to have been set as described above by way of example), the bridge circuit is either balanced exactly or unbalanced in such direction that $V_O$ lags $V_E$. In either event, no positive going pulses are produced by the switching action of the chopper transistor 27, and no shift pulses appear on the shift line 39. Therefore the stepper circuit will remain in its initial condition, with FFA at 1 and FFB at 0, and the under tolerance indicator 43 will remain actuated.

If the object weighs more than 15 ounces, the bridge circuit will be unbalanced in such direction that $V_O$ leads $V_E$ in the manner indicated prior to time $T_K$ in FIG. 3, resulting in positive going $V_P$ pulses at the input of amplifier 26, and shift pulses $V_{ps}$ on the shift line 39. The first such shift pulse to occur after the set pulse is denoted by the reference character 56 in line $V_{ps}$ of FIG. 3. This pulse shifts the 1 from FFA to FFB, turning the under tolerance indicator 43 off and the within tolerance indicator 44 on, and energizing the relay 23 to place the resistor 19 in the bridge circuit. The time of relay closure is indicated as $T_K$ on line $V_O$ of FIG. 3.

With resistor 19 in the bridge circuit, if the weight is 17 ounces or less, the bridge is either balanced exactly, or unbalanced in such direction that $V_O$ lags $V_E$, as shown in FIG. 3 subsequent to $T_K$. In either event, no further shift pulses are produced; the stepper stands at 01, and the within tolerance indicator 44 remains on. If the weight is over 17 ounces, the bridge is still unbalanced in the same direction ($V_O$ leading $V_E$) after insertion of the resistor 19, and another shift pulse is produced upon the next closure of transistor 27. This shift pulse will leave FFA at 0, and place FFB at 0. With both bistable devices at 0, both indicators 43 and 44 are off, and the over tolerance indicator 45 is turned on by way of "and" circuit 51 and line 48.

The entire checkweighing operation is completed within, at most, two full clock wave cycles, i.e. one thirtieth second, assuming 60 cycle per second excitation frequency. The operation can be repeated, or another object check weighed, any time after the monostable multivibrator 54 returns to its stable state. Preferably the waiting period is made long enough, say several clock cycles, to allow time for damping of the motion of the platform 12 after the object has been placed on it.

Although the invention has been described as embodied in a three zone check weigher, it will be understood without further illustration that the system could be adapted readily for classifying any type of measurements, and could be extended to provide any desired number of classification zones by using additional resistors such as resistor 19 in the bridge circuit, and corresponding relays and stepper circuit stages.

I claim:

1. Apparatus for classifying a measurement according to its magnitude in one of a plurality of categories, comprising
    (a) a bridge circuit adapted to be excited by alternating current and to provide, when unbalanced, an alternating output voltage having an amplitude depending upon the amount of unbalance and a phase depending upon the sense of unbalance,
    (b) said bridge circuit including one variable arm and means for varying said arm in accordance with the magnitude of said measurement, and a second variable arm adapted to be varied stepwise to different discrete values,
    (c) voltage sampling means adapted to be operated synchronously with the bridge excitation to sample peaks of the bridge output voltage and provide output pulses of polarity depending upon the phase of said bridge output voltage with respect to said excitation,
    (d) means responsive to an output pulse of a polarity corresponding to unbalance of said bridge circuit in one sense for varying said second variable arm of said bridge circuit to approach balancing the bridge, and
    (e) means responsive to said last mentioned means for indicating the category of the magnitude of said measurement.

2. The invention set forth in claim 1, wherein said second variable arm is adapted to be set either at a first value that substantially balances the bridge when the magnitude of said measurement is at the lower limit of a within-tolerance category, or at a second value that substantially balances the bridge when the magnitude of said measurement is at the upper limit of said category, further including means for initially setting said second variable arm at said first value.

3. The invention set forth in claim 1, wherein said voltage sampling means includes a switch device adapted to be placed in either of first and second conditions, a storage device, means including said switch device for applying said bridge output voltage to said storage device when said switch device is in said first condition and for discharging said storage device rapidly to produce a pulse when said switch device is in said second condition, and means responsive to alternating current exciting the bridge circuit for placing said switch device in said first condition prior to each alternate peak of bridge output voltage and in said second condition substantially coincidentally with the occurrence of each of said alternate peaks.

4. The invention set forth in claim 1, wherein said means responsive to said output pulses for varying said second variable arm includes stepping means adapted to be placed selectively in three distinct conditions, means for setting said stepping means initially to a first condition, means responsive to the output pulse first occurring subsequent to the initial setting to place said stepping means in a second condition, means responsive to said second condition of said stepping means to discretely vary said second variable arm of said bridge, and means responsive to the occurrence of a second pulse after initial setting to place said stepping means in its third condition.

5. The invention set forth in claim 4 wherein said means for indicating category responds to the condition of said stepping means as follows:

First condition . . . under tolerance
Second condition . . . within tolerance
Third condition . . . over tolerance and said means for resetting said stepping means also resets said second variable arm to an initial value that balances the bridge when the magnitude of said measurement is at the lower limit of a within-tolerance category.

6. Apparatus for classifying a measurement according to its magnitude in one of a plurality of categories including under-tolerance, within-tolerance, and over-tolerance, comprising
    (a) first and second sources of alternating voltages of the same frequency and of amplitudes corresponding respectively to the magnitude of said measurement and to a reference magnitude in said within-tolerance category,
    (b) an impedance network comprising first and second impedance devices, one of said impedance devices being adapted to be set selectively at different discrete impedances,
    (c) said sources being connected to said impedance network to form a bridge circuit providing an output alternating voltage having an amplitude depending upon the amount of unbalance of the bridge circuit and a phase depending upon the sense of such unbalance,
    (d) a capacitor,
    (e) means including a switch device connected to said capacitor and to said bridge circuit for applying the output of said bridge circuit to said capacitor when said switch device is in a first condition, and discharging said capacitor rapidly to produce a pulse when said switch device is placed in a second condition, the polarity of said pulse depending upon the sense of unbalance of said bridge circuit,
    (f) means for actuating said switch device alternately between its first and second conditions at the frequency of said alternating voltages and in synchronism with the excursion peaks of said bridge output voltage,
    (g) a pulse amplifier for amplifying said capacitor discharge pulses, and adapted to amplify only signal components of frequencies substantially higher than that of said alternating voltages,
    (h) means for selecting amplified pulses of a polarity corresponding to one sense of unbalance of said bridge and rejecting pulses of the opposite polarity,
    (i) stepping means comprising first and second bistable devices, each capable of being placed in either of two states,
    (j) means for initially setting said bistable devices to respective initial states,
    (k) means responsive to the amplified pulse of said selected polarity first occurring subsequent to setting said bistable devices to change the states of both said bistable devices from their initially set states to their respective other states,
    (l) said last mentioned means being responsive to an amplified pulse of said selected polarity occurring after said first pulse to reset only the second bistable device to its originally set state, (m) means responsive to the first mentioned change of the second bistable device from its initially set state to its other state for changing the impedance of said one device from one of said discrete impedances to another, (n) means responsive to continued existence of said initially set state of said first bistable device to provide a signal representing under-tolerance, (o) means responsive to continued existence of said other state of said second bistable device to provide a signal representing within-tolerance, and (p) means responsive to continued existence of said initially set state of said second bistable device and said other state of said first bistable device to provide a signal representing over-tolerance.

7. A digital to analog comparator comprising (a) a bridge circuit adapted to be excited by alternating current and to provide, when unbalanced, an A-C output having an amplitude depending upon the amount of unbalance and a leading or lagging phase with respect to the exciting alternating current depending upon the sense of unbalance, (b) said bridge circuit including one variable arm adapted to be varied in accordance with the quantitative value of an analog input to the comparator and (c) a second variable arm comprising impedance means and means for varying the impedance of said second variable arm to different discrete values in accordance with the quantitative value of a digital input to the comparator, (d) a capacitor, (e) means including a switch device connected to said capacitor and to said bridge circuit for applying the A-C output of said bridge circuit to said capacitor when said switch device is in a first condition, and discharging said capacitor rapidly to provide an output pulse when said switch device is placed in a second condition, (f) means for actuating said switch device alternately between its first condition and its second condition at the frequency of said bridge excitation alternating current and in substantial coincidence with the excursion peaks of said bridge A-C output, and (g) utilization means responsive to the polarity of said output pulse.

References Cited

UNITED STATES PATENTS

| 2,901,685 | 8/1959 | Alder. | |
| 3,112,805 | 12/1963 | Williams | 177—46 |
| 3,237,025 | 2/1966 | Clapper | 328—116 XR |
| 3,267,375 | 8/1966 | Olsen | 324—99 XR |
| 3,330,954 | 7/1967 | Cox et al. | 324—118 XR |

OTHER REFERENCES

Semiconductor Products, W. S. Massey, February 1961, pp. 42–46. Copy in 330–10.

RUDOLPH V. ROLINEC, Primary Examiner

E. F. KARLSEN, Assistant Examiner

U.S. Cl. X.R.

177—46, 210; 324—103